United States Patent [19]
Kurtz et al.

[11] Patent Number: 5,702,619
[45] Date of Patent: Dec. 30, 1997

[54] METHOD FOR FABRICATING A HIGH PRESSURE PIEZORESISTIVE TRANSDUCER

[75] Inventors: Anthony D. Kurtz, Teaneck, N.J.; Andrew V. Bemis, Chestnut Ridge, N.Y.; Timothy A. Nunn, Ridgewood; Alexander A. Ned, Bloomingdale, both of N.J.

[73] Assignee: Kulite Semiconductor Products, Inc., Leonia, N.J.

[21] Appl. No.: 723,519

[22] Filed: Sep. 30, 1996

Related U.S. Application Data

[62] Division of Ser. No. 596,506, Feb. 5, 1996, Pat. No. 5,614, 678.

[51] Int. Cl.⁶ .................. H01L 21/00; B44C 1/22
[52] U.S. Cl. ............... 216/2; 156/633.1; 156/657.1; 216/33
[58] Field of Search ............... 156/631.1, 633.1, 156/647.1, 657.1, 662.1; 216/2, 33; 148/DIG. 159; 437/228 SEN, 921, 901; 73/727

[56] References Cited

U.S. PATENT DOCUMENTS

| | | |
|---|---|---|
| 3,800,264 | 3/1974 | Kurtz et al. |
| 3,819,431 | 6/1974 | Kurtz et al. |
| 3,930,823 | 1/1976 | Kurtz et al. |
| 4,040,172 | 8/1977 | Kurtz et al. |
| 4,236,137 | 11/1980 | Kurtz et al. |
| 4,467,656 | 8/1984 | Mallon et al. |
| 4,476,726 | 10/1984 | Kurtz et al. |
| 4,481,497 | 11/1984 | Kurtz et al. |
| 4,510,671 | 4/1985 | Kurtz et al. ......... 148/DIG. 159 X |
| 4,622,856 | 11/1986 | Binder et al. |
| 4,672,354 | 6/1987 | Kurtz et al. |
| 4,814,856 | 3/1989 | Kurtz et al. |
| 4,954,769 | 9/1990 | Kalthoff |
| 4,975,390 | 12/1990 | Fugii et al. ............... 437/901 X |
| 5,165,283 | 11/1992 | Kurtz et al. |
| 5,169,472 | 12/1992 | Goebel ............... 148/DIG. 159 X |
| 5,286,671 | 2/1994 | Kurtz et al. |
| 5,289,721 | 3/1994 | Tanizawa et al. |
| 5,303,594 | 4/1994 | Kurtz et al. |
| 5,376,818 | 12/1994 | Kurtz |
| 5,405,786 | 4/1995 | Kurtz |
| 5,425,841 | 6/1995 | Kurtz et al. |
| 5,473,944 | 12/1995 | Kurtz et al. |

*Primary Examiner*—William Powell
*Attorney, Agent, or Firm*—Plevy & Associates

[57] ABSTRACT

A method of fabricating a high pressure piezoresistive pressure transducer having a substantially linear pressure versus stress output over its full range of operation. The method involves bonding a carrier wafer having a dielectric isolating layer on one surface and a supporting member on the opposite surface, to a pattern wafer containing at least two single crystalline longitudinal piezoresistive sensing elements of a second conductivity. Both the pattern wafer and sections of the carrier wafer are etched leaving the piezoresistive sensing elements bonded directly to the dielectric isolating layer, and a diaphragm member having a deflecting portion and a non-deflecting portion. The diaphragm member is constructed to have an aspect ratio which is of the order of magnitude of one. The piezoresistive sensing elements have a large transverse piezoresistive coefficient normal to the plane of the diaphragm and both a large longitudinal piezoresistive coefficient and a small transverse piezoresistive coefficient in the plane of the diaphragm. One of the at least two piezoresistive sensing elements is positioned above the non-deflection portion of the diaphragm in an area of minimal longitudinal stress and the other is positioned above the deflecting portion of the diaphragm in an area of high compressive stress. The positioning of the second sensor over the deflecting portion of the diaphragm is selected so that there will be equal and opposite resistance changes registered from the sensors. The method results in an improved transducer design when compared to prior art devices.

6 Claims, 8 Drawing Sheets

METHOD FOR FABRICATING A HIGH PRESSURE PIEZORESISTIVE TRANSDUCER

This is a Divisional of application Ser. No. 08/596,506, filed on Feb. 5, 1996 for HIGH PRESSURE PIEZORESISTIVE TRANSDUCER, now U.S. Pat. No. 5,614,678.

FIELD OF INVENTION

The field of the present invention relates generally to semiconductor transducers and more particularly, to a high pressure piezoresistive transducer structure utilizing specially arranged sensor elements on a diaphragm design that in combination reduce mechanical and electrical non-linearities.

BACKGROUND OF THE INVENTION

Prior art is filled with numerous examples of pressure transducers. All diaphragm based pressure transducers have one thing in common, and that is converting an applied pressure into stresses in the plane of the diaphragm. These stresses can be conveniently measured and converted into an electrical signal by use of piezoresistive sensors which are mounted on or are part of the diaphragm. For instance, U.S. Pat. Nos. 3,800,264 entitled "HIGH TEMPERATURE TRANSDUCERS AND HOUSING INCLUDING FABRICATION METHODS", and 3,819,431 entitled "METHOD OF MAKING TRANSDUCERS EMPLOYING INTEGRAL PROTECTIVE COATINGS AND SUPPORTS" both issued to A. D. Kurtz et al. and assigned to Kulite Semiconductor Products, Inc., the assignee herein, demonstrate this principle. The most common arrangement is that of a clamped edge diaphragm wherein the outer portion of the diaphragm is fixed and the central region deflects under applied pressure. In this conventional device, the stress on the surface of the diaphragm varies from a maximum tensile stress at the clamped edges to a maximum compressive stress in the center of the diaphragm. The diaphragm can be made of metal, to which the sensors are cemented, or in the case of the cited patents, from a semiconductor material such as silicon on which the sensors are either embedded or affixed. For the cases where the diaphragm is silicon, one must recognize the fact that the piezoresistive effect varies with crystallographic orientation and in order to determine how the stresses are converted into resistance changes, the crystallographic properties of the piezoresistive coefficients must be taken into account.

Following the conventions introduced in an article entitled "SEMICONDUCTING STRESS TRANSDUCERS USING TRANSVERSE AND SHEAR PIEZORESISTANCE" by Pfann, et al. and appearing in the Journal of Applied Physics, Vol. 32, 1961, two distinct types of piezoresistive coefficients may be defined. These two piezoresistive coefficients are longitudinal and transverse. The longitudinal piezoresistive coefficient relates the relative resistance change due to an applied stress in a piezoresistive element when the stress is in the same direction as the current flow through the element. The transverse piezoresistive coefficient relates the relative resistance change due to an applied stress in a piezoresistive element when the stress is at right angles to the current flow through the elements. It should be noted that the transverse piezoresistive coefficient can be defined for a stress in the plane of the sensor as well as for a stress normal to that plane.

The operation of a piezoresistive pressure transducer can be broken down into three separate and simultaneously occurring phenomena. First, the diaphragm of the device converts the applied pressure into both surface and normal stresses. Second, the resistances of the piezoresistive elements (or "gauges" as they are referred to by those skilled in the art) are modified by these stresses, and third, the resistance changes of the gauges are converted into a single voltage change by a Wheatstone bridge circuit.

The various stresses that occur in a diaphragm due to an applied pressure can be obtained by applying conventional elastic theory using equations well known and commonly referred to in the art. For example, the amount of stress in a circular diaphragm transducer that is generated by an applied pressure will be worked out as follows:

For the normal stress (i.e., the stress perpendicular to the surface), the pressure-stress relationship is given by $$\sigma_z = -P$$

and for surface stresses (i.e., the stresses parallel to the surface), the relationship is given by:

$$\sigma_r = \frac{3}{8} \frac{P}{T^2} [r^2(3+\upsilon) - \alpha^2(1+\upsilon)] \quad (2)$$

where $\sigma_z$ is the stress perpendicular to the surface, $\sigma_r$ is the stress in the radial direction which occurs at right angles to the clamped edge, P is the applied pressure, $\alpha$ is the radius of the circular diaphragm, T is the diaphragm thickness, $\upsilon$ is the Poisson's ratio, and r is the stress location. From equation (2), it is obvious that the maximum compressive (negative) stress occurs when r=0, which is located at the center of the diaphragm, and is given by:

$$\sigma_{rC} = -\frac{3}{8}(1-\upsilon)P\left(\frac{\alpha}{T}\right)^2 \quad (3)$$

wherein the ratio of $\alpha/T$ is referred to as the aspect ratio of the diaphragm. The maximum tensile (positive) stress occurs when r=$\alpha$, which is at the clamped edge of the diaphragm and is given by:

$$\sigma_{rE} = \frac{3}{4}P\left(\frac{\alpha}{T}\right)^2 \quad (4)$$

Along the diaphragm surface, the stress starts at this high positive stress level along the clamped edge, and then decreases until it reaches a maximum negative stress level in the center of the diaphragm.

For a square shaped diaphragm, the equations for the stress at the clamped edge and the center of the diaphragm are similar to those described above, except for the magnitude of the equation coefficients. The equations for a square shaped diaphragm are as follows:

$$\sigma_{CX} = \sigma_{CY} = -0.1386 P\left(\frac{\alpha}{T}\right)^2 \quad (5)$$

$$\sigma_{EX} = 0.307 P\left(\frac{\alpha}{T}\right)^2 \quad \sigma_{EY} = 0.087 P\left(\frac{\alpha}{T}\right)^2 \quad (6)$$

wherein $\sigma_{CX}$ and $\sigma_{CY}$ are the X and Y direction surface stress at the diaphragm center, $\sigma_{EX}$ is the X direction stress at the clamped edge of the diaphragm, and $\sigma_{EY}$ is the Y direction stress at the clamped edge of the diaphragm.

The equations expressing normal and surface stresses having been established, the stress is next converted into a resistance change of the sensing elements by utilizing the piezoresistive effect. The governing equation for this resistance change is as follows:

$$\frac{\Delta R}{R} = \sigma_x \pi_x - \sigma_y \pi_y - \sigma_z \pi_z \quad (7)$$

In this equation, ΔR is the change in gauge resistance under stress, which can be either a positive or negative change. R is the zero stress resistivity, σ is the stress in the direction labeled by the subscript, and π is the piezoresistive coefficient in the subscript labeled direction. Generally, for the most efficient operation of the transducer device, one longitudinal gauge may be placed at or near the clamped edge of the diaphragm and one placed at the center of the diaphragm, with the crystallographic axis of the gauges chosen such that a maximum longitudinal coefficient and a minimum transverse coefficient are realized, or in other words, these gauges will be sensitive to X direction surface stress and insensitive to Y direction surface stresses. Given this setup, an output voltage can then be generated in a Wheatstone bridge circuit (which utilizes four gauges), having a voltage equation given by:

$$\frac{V_{Out}}{V_{In}} = \frac{(R_1 - \Delta R_2)(R_4 - \Delta R_4) (R_1 - \Delta R_1)(R_2 - \Delta R_2)}{(R_1 - \Delta R_1 - R_2 - \Delta R_2)(R_1 - \Delta R_3 - R_4 - \Delta R_4)} \quad (8)$$

wherein $R_1$, $R_2$, $R_3$, and $R_4$ are the zero stress gauge resistance values, $\Delta R_1$, $\Delta R_2$, $\Delta R_3$, and $\Delta R_4$ are the changes in gauge resistance with pressure, $V_{in}$ is the excitation voltage and $V_{out}$ is the bridge output voltage. If the bridge is made from piezoresistors with the same zero stress value and the resistance change of each individual piezoresistor is equal in magnitude, but adjacent gauges have an opposite sign change, the equation becomes:

$$\frac{V_{out}}{V_{In}} = \frac{\Delta R}{R} \quad (9)$$

A conventional low pressure (<100 PSI) transducer is typically designed to have a full scale surface stress between 15,000 and 30,000 PSI so that the output voltage of the Wheatstone bridge is between 75 to 150 mV. A cross-sectional view of through a such a conventional prior art low pressure piezoresistive pressure transducer is depicted in FIG. 1A. The transducer assembly 10 consists of a carrier wafer 12 which may be fabricated from a semiconductor material, such as N-type silicon, and is preferably a single crystal structure. Such wafers are commercially available and are well known in the art. The wafer has a thin passivating dielectric oxide layer 14 on one surface and a glass or silicon supporting member 16 which is anodically or otherwise bonded to the other. A shallow depression 18 has been etched into the carrier wafer 12 and serves to define the diaphragm member 24 which has a deflecting region 28 and a non-deflecting region 29. The diaphragm has a vertical thickness 22 and a lateral dimension 21. Positioned above the diaphragm region 24 and bonded to the oxide layer 14 are the piezoresistive sensing elements 25 and 27. These sensing elements are designated outer sensing elements 25 and inner sensing elements 27 depending on their position in the device. The outer sensing elements 25 are positioned above the clamped edge of the diaphragm, while the inner sensing elements 27 are positioned near the center of the diaphragm. The outer sensing elements 25, because they are under tension at low pressures, exhibit a positive change in resistance, and the inner sensing elements 27, because they are under compression at these pressures, exhibit a negative change in resistance. The sensing elements 25 and 27 are typically fabricated from highly doped P+ monocrystalline semiconductor material and may be shaped in very intricate patterns.

The magnitude of the stresses across the diaphragm surface of the device depicted in FIG. 1A is graphically depicted in FIG. 1B. The analysis performed to generate the stress profiles shown in this figure and in all other graphs to be shown was accomplished using a finite element analysis program which subdivides the system into small segments and solves them simultaneously. Such programs produce highly accurate results and are well known to those versed in the art. This analytical method was chosen over a theoretical one due to the difficulty in obtaining accurate closed form solutions for the systems in question. According to the graph depicted in FIG. 1B, the X axis represents a distance (measured from the edge of the device to its center) and the Y axis represents a stress (either tensile or compressive) exhibited by the transducer's top surface at the given distance. The upper curve 34 corresponds to measurements of surface stresses as one tracks from left to right across the device. The curve reaches a maximum value 35 at a point where the tensile stress is the greatest and a minimum value 33 where the compressive stress is the greatest. The lower curve 37 is a measurement of the applied pressure normal to the surface of the device, and is near zero relative to the resulting surface stresses as displayed on the graph. A typical case would have a full scale surface stress of 20,000 PSI and thus require an α/T ratio of approximately 20. For transducers designed to operate at lower pressures, a higher α/T ratio is required. For transducers designed to operate at higher pressures, a lower α/T ratio is required.

At both high and low values of this α/T ratio, a mechanical non-linearity between the applied pressure and the surface stresses occurs. This non-linearity can be overcome by increasing the efficiency of the applied pressure to surface stress conversion. This increase in efficiency has been demonstrated in an improved low pressure traducer design which allows the fabrication of high output, low pressure sensors with substantially linear outputs. The device is described in U.S. Pat. No. 4,236,137 entitled "SEMICONDUCTOR TRANSDUCERS EMPLOYING FLEXURE FRAMES", issued to Anthony D. Kurtz et al., and assigned to Kulite Semiconductor Products, Inc., the assignee herein. A cross-sectional schematic diagram of the device 20 is depicted in FIG. 2A. The transducer pictured therein has essentially all of the same features of the device depicted in FIG. 1A, but differs in that it employs a thick central boss 23. This thick central boss 23 operates to improve the stiffness of the deflecting diaphragm member 24 thus allowing it to achieve a large output while avoiding the problem of undue diaphragm stresses. In this design, the maximum tensile surface stress still occurs at the clamped edge of the diaphragm, but the maximum compressive stress now occurs at the edge of the boss.

The magnitude of the stresses across the bossed diaphragm surface of the device depicted in FIG. 2A is graphically depicted in FIG. 2B. As in the graph depicted in FIG. 1B, the axes are stress versus distance. The upper curve 30 corresponds to measurements of surface stresses as one tracks from left to right across the device. The curve reaches a maximum value 36 at a point where the tensile stress is the greatest and a minimum value 38 where the compressive stress is the greatest. The lower curve 32 is a measurement of the applied pressure normal to the surface of the device, and is near zero relative to the resulting surface stresses as displayed on the graph.

For extremely high pressures (>20000 PSI), the α/T ratio is close to one, and not even the bossed diaphragm design remains valid. FIG. 3 demonstrates such a case. As in the previously discussed graphs, the axes in FIG. 3 are stress versus distance. Notice should be taken of the fact that this graph differs significantly from those depicted in FIGS. 1B and 2B. Specifically, since the device is operated at a high pressure, there is a net compressive stress and there is no longer a point of positive (tensile) stress. Therefore, the top of the Y axis on this series of graphs (and not its center) represents the zero point stress region. The upper curve 80 corresponds to measurements of surface stresses as one tracks from left to right across the device. The curve reaches a maximum value 84 at a point where the compressive stress is the least, and a minimum value 85 where the compressive stress is the greatest. The lower curve 82 is a measurement of the applied pressure normal to the surface of the device, and, as mentioned above, is not near zero as it was in the prior art low pressure transducer devices. It is here where current methodology .is shown to be lacking as there is currently no way to form a gauge with a positive resistance change. This inability to create negatively and positively changing gauges for inclusion into the Wheatstone bridge circuit causes the bridge to exhibit an electrical non-linearity of applied pressure to output voltage which results in a defective transducer design.

It is, however, possible by appropriate choice of crystallographic orientation for the gauges and by taking into account the crystallographic dependencies of the piezoresistive coefficients for the case of high normal pressure stress, to obtain a positive changes in resistance. Comparison of FIGS. 2B and 3 shows that for the conventional low pressure design, the normal stress is negligible when compared to the surface stresses, but for the high pressure transducer, the normal stress is of the same order of magnitude as the surface stresses. This property can be exploited in the design of an improved high pressure transducer.

It is therefore a primary objective of the present invention to provide a piezoresistive pressure transducer which is capable of operating at pressures in excess of 20000 psi without the diminished output experienced by prior art piezoresistive transducers and that does not experience the non-linear pressure versus stress behavior found in these prior art devices.

SUMMARY OF THE INVENTION

A method of fabricating a piezoresistive pressure transducer that is capable of operating at high pressures while maintaining a substantially linear pressure versus stress output over its full range of operation. The method comprises bonding a carrier wafer of single crystalline semiconducting material of a first conductivity and having a dielectric isolating layer on one surface and a supporting member on the opposite surface, to a pattern wafer containing at least two single crystalline longitudinal piezoresistive sensing elements of a second conductivity. Both the pattern wafer and sections of the carrier wafer are etched leaving the piezoresistive sensing elements bonded directly to the dielectric isolating layer, and a diaphragm member having a deflecting portion and a non-deflecting portion. The diaphragm member is constructed to have an aspect ratio which is of the order of magnitude of one. The piezoresistive sensing elements have a large transverse piezoresistive coefficient normal to the plane of the diaphragm and both a large longitudinal piezoresistive coefficient and a small transverse piezoresistive coefficient in the plane of the diaphragm. One of the at least two piezoresistive sensing elements is positioned above the non-deflection portion of the diaphragm in an area of minimal longitudinal stress and the other is positioned above the deflecting portion of the diaphragm in an area of high compressive stress. The positioning of the second sensor over the deflecting portion of the diaphragm is selected so that there will be equal and opposite resistance changes registered from the sensors. The method results in an improved transducer design when compared to prior art devices.

BRIEF DESCRIPTION OF THE DRAWINGS

In order to better understand the present invention, reference should be made to the following detailed description taken in conjunction with the accompanying drawings wherein.

DETAILED DESCRIPTION OF THE INVENTION

Figure 1A:
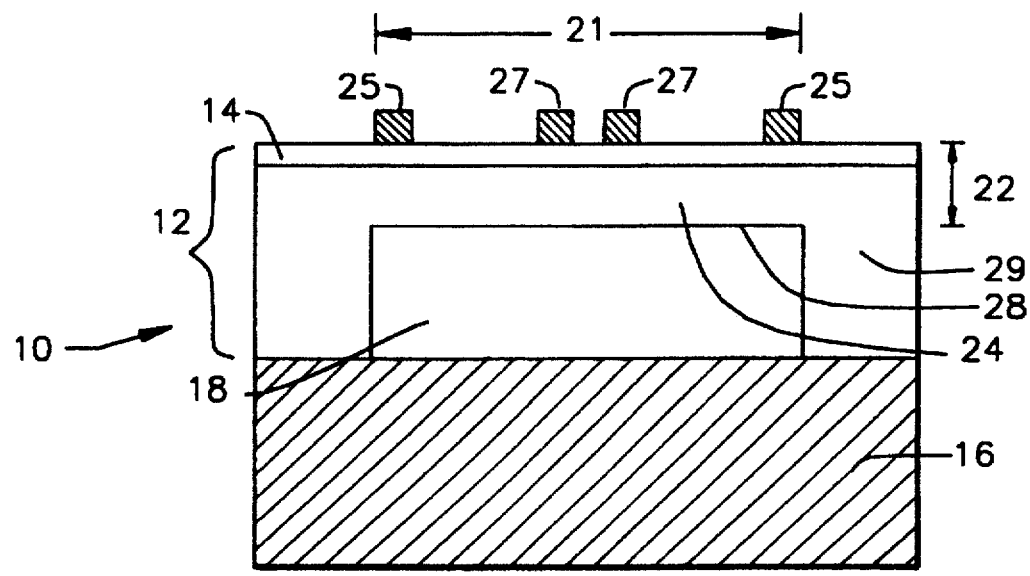
FIG. 1A depicts a cross-sectional view through a conventional low pressure piezoresistive pressure transducer made in accordance with prior art techniques.

The present invention provides an improved piezoresistive pressure transducer assembly which substantially overcomes the nonlinearity problems associated with prior art pressure transducers when used at high pressures. Since in such a device it is desirable to have sensitivity to stress normal to the plane of the device to be of opposite sign to that of the sensitivity to stress in the plane of the device, conventional methodology, which would place the sensors on the clamped edge and center of the diaphragm, cannot be relied upon. This is because under high pressure both sensors would have the same sign resulting in a diminished output in the device. An improvement in transducer design is accomplished in the present invention through a series of processing steps which will result in a high pressure transducer design having a sensor array in which both positive changing and negative changing piezoresistive sensing elements are present. This improvement is accomplished through a combination of the careful selection and crystallographic orientation of sensor materials, and by placing one of the sensing elements above the deflecting diaphragm region and the other above a non-deflecting diaphragm region so that even at high pressures, one gauge undergoes a negative change in resistance and the other undergoes a positive change in resistance.

A careful analysis of the individual piezoresistive coefficients is required in order to better illustrate the theoretical underpinnings of the improved transducer device disclosed herein. It is first important to understand that piezoresistive coefficients may be either longitudinal or transverse depending if the current density flowing through the gauge is parallel or perpendicular to the induced stress. The majority of semiconductor type diaphragm pressure transducers utilize either (100) and (110) plane silicon for the sensing network and/or the diaphragm structure. For the case of (110) plane sensors, it is desirable to have a large longitudinal coefficient and a near zero transverse coefficient, while in the (100) case it is desirable to have both large longitudinal and transverse coefficients. Following the teaching of Pfann et al., a complete equation for a gauge formed out of (110) silicon oriented so that one of the gauge's <110> directions is parallel to the X surface stress direction, the <100> direction is oriented to the Y surface stress direction, and the other <110> direction is oriented to the normal Z stress direction is as follows:

$$\frac{\Delta R}{R} = \qquad (10)$$

$$\sigma_x \left( \frac{\pi_{11} + \pi_{12} + \pi_{44}}{2} \right) + \sigma_y(0) + \sigma_z \left( \frac{\pi_{11} + \pi_{12} - \pi_{44}}{2} \right)$$

Similarly, the following equation gives the complete equation for a gauge formed out of (100) silicon oriented so that the gauge's <110> directions are parallel to the surface stress directions and the <100> direction is oriented to the normal stress direction:

$$\frac{\Delta R}{R} = \qquad (11)$$

$$\sigma_x \left( \frac{\pi_{11} + \pi_{12} - \pi_{44}}{2} \right) + \sigma_y \left( \frac{\pi_{11} + \pi_{12} + \pi_{44}}{2} \right) + \sigma_z(0)$$

Figure 2B:
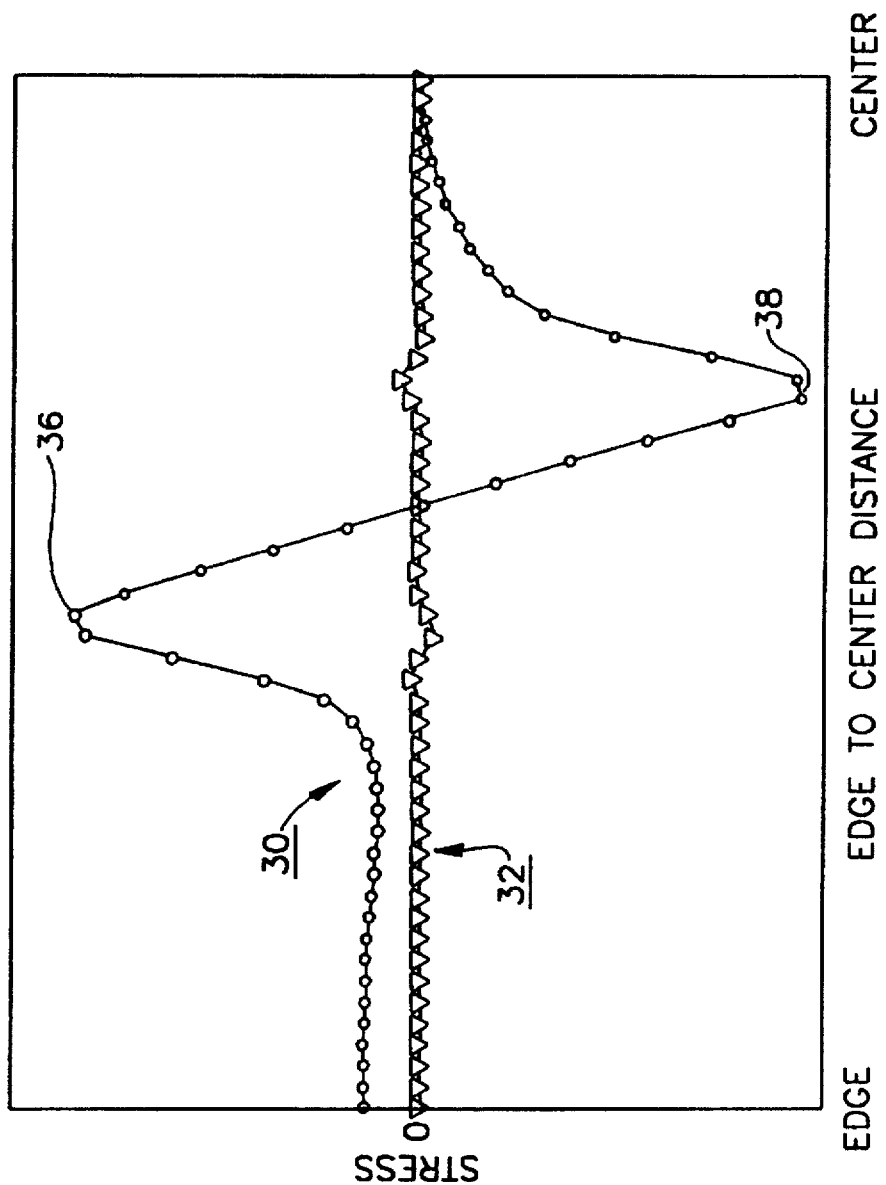
FIG. 2B depicts a graph showing the tensile and compressive stresses exhibited on the top surface of the transducer device of FIG. 2A over both the deflecting and non-deflecting portions.
Figure 3:
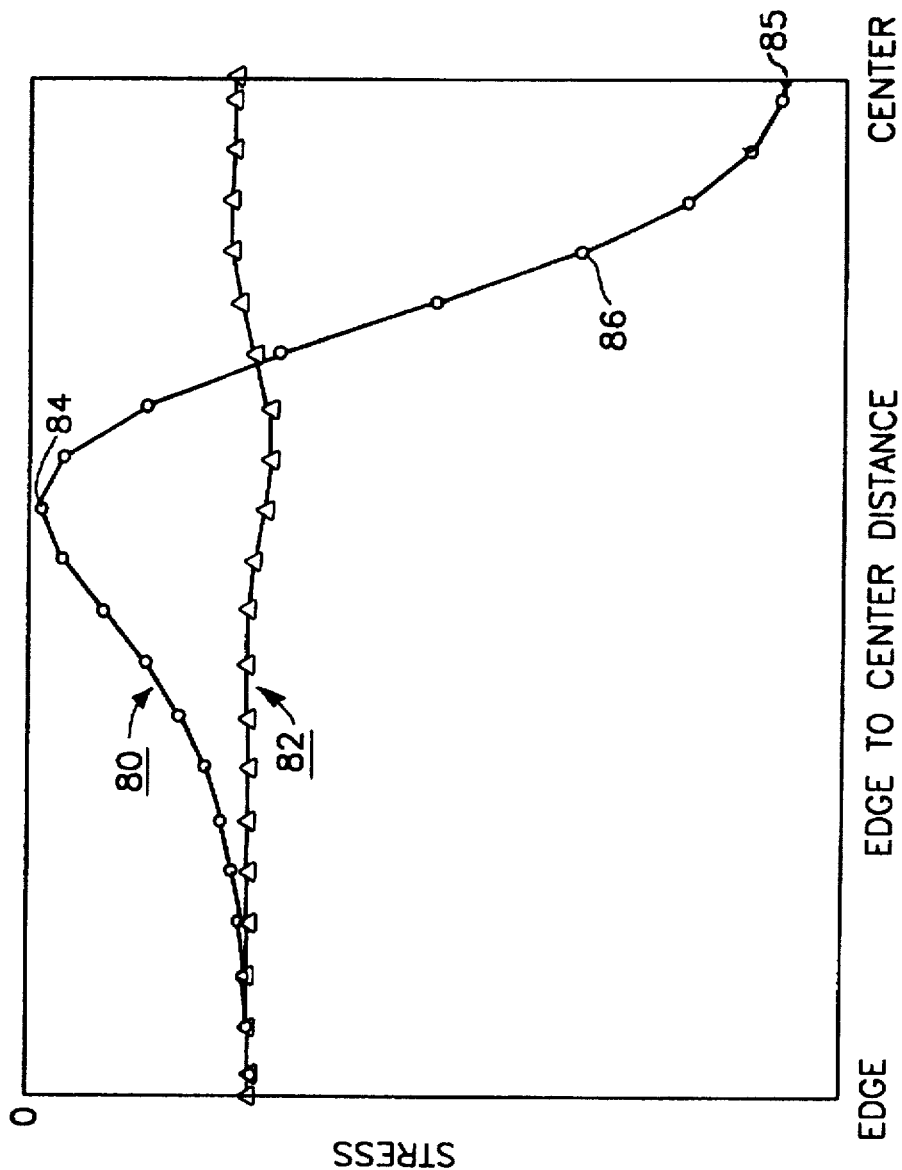
FIG. 3 depicts a graph showing the compressive stresses exhibited on the top surface of a high pressure piezoresistive transducer device over both the deflecting and non-deflecting portions.

In the above equations, $\pi_{11}$, $\pi_{12}$, and $\pi_{44}$, are dependent on element type, doping species type, and doping density. For a p-type silicon gauge, piezoresistive coefficients $\pi_{11}$ and $\pi_{12}$ are approximately zero, and the $\pi_{44}$ piezoresistive coefficient is very large. As can be observed in equation (11), the (100) silicon gauge is unsuited for exploiting the normal surface stress as the piezoresistive coefficient is zero for the normal stress in that crystallographic orientation. However, according to equation (10), the (110) silicon gauge is well suited for exploiting the normal surface stress in that the transverse piezoresistive coefficient has a large negative value and that the normal stress is also always a compressive or negative stress. The result of this is that the normal stress contributes to an increase in the gauge's resistance value with pressure (i.e., the gauge can have a positive change with applied pressure). The other non-zero piezoresistive coefficient for (110) silicon according to equation (10) is longitudinal and is associated with the <110> direction (X) surface stress. The coefficient is positive in value, which leads to an increase or decrease in resistance depending upon the sign of this surface stress, though as the α/T ratio decreases from its conventional value downwards, the surface stress goes from a profile exhibiting essentially equal tensile and compressive stress regions (as depicted in FIG. 2B) to a profile with no tensile stress and only compressive stress (as depicted in FIG. 3) existing on the surface.

With the exploitation of the normal surface stress by the appropriate selection of gauge material and crystallographic orientation, a gauge with the potential of having a positive resistance change with pressure has been shown for the case where the α/T ratio is low and where the normal surface stress is of the same order of magnitude as the surface stresses in the plane of the device.

For p-type silicon (110) plane gauges, equation (10) reduces to:

$$\frac{\Delta R}{R} = \sigma_x \left( \frac{\pi_{44}}{21} \right) + \sigma_z \left( \frac{\pi_{44}}{2} \right) \qquad (12)$$

Referring to equation (12), and in combination with FIG. 3, the positioning of a such a gauge in order to obtain the maximum positive resistance can be described as follows. First, the normal stress in a high pressure device is a high negative value to begin with. It is a compressive stress with an essentially constant value across the surface of the transducer. The negative stress value ($\sigma_z$) in conjunction with the negative value of the transverse piezoresistive coefficient ($-\pi_{44}$) results in a positive resistance change. To maximize this positive change, the first part of equation (12) must be made as small as possible. Given both the positive value of the longitudinal coefficient and the in-plane surface stress profile, the combination of which always results in a negative product, the gauge placement must occur at a point where the X surface stress reaches its lowest magnitude value. This point 84 is illustrated in FIG. 3. Positioning a gauge at a distance on the transducer corresponding to point 84 in FIG. 3 will therefore yield a positive changing sensor with a large positive shift when under pressure.

The construction of a Wheatstone bridge, however, requires both positive and negative gauges, the change in magnitude of which should be as similar as possible. A negative changing gauge of the same magnitude as the above-mentioned positive changing gauge can now be obtained by the correct positioning of the second gauge. Utilizing equation (12), which allowed the optimum placement of the positive changing gauge, and in combination with FIG. 3, the placement of this negative changing gauge can be determined by setting the magnitude of the needed negative resistance change to that of the magnitude of the positive change. Using the graph depicted in FIG. 3, and taking the difference of the in-plane surface stress to the normal surface stress until an equivalence point is achieved, a point at which the negatively changing gauge should be placed can be determine. This point is located at the position marked by 86 in FIG. 3. Such careful placement of the positively changing gauges and the negatively changing gauges having resistance values of the same order of magnitude will result in a Wheatstone bridge circuit having a highly linear high pressure electrical output, and, since these gauges have equal and opposite changes in resistance, there will be no net resistance change in the bridge under the application of pressure.

To those skilled in the art, it is obvious that in addition to improving the characteristics of a high pressure design, this design methodology can also be applied to lower pressure transducers (from 2000 to 20000 psi) to enhance their electrical characteristics. It is apparent to someone versed in the art that there are some distortions in the stress distribution in this range of devices causing a diminished tensile stress in the deflecting portion of the diaphragm near the clamp. This maximum tensile stress distribution is caused by the presence of the very high normal stresses and the required device geometry, with the peak tensile stress in fact occurring inside the non-deflecting portion of the diaphragm for devices over and above this pressure range.

Figure 4A:
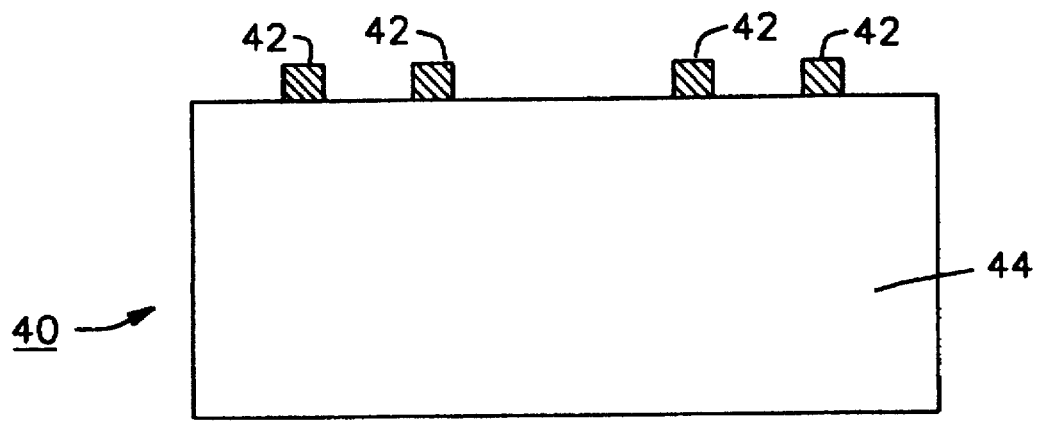
FIGS. 4A–4E depict cross-sectional views illustrating various process steps of fabricating the improved high pressure transducer device of the present invention.
Figure 4B:
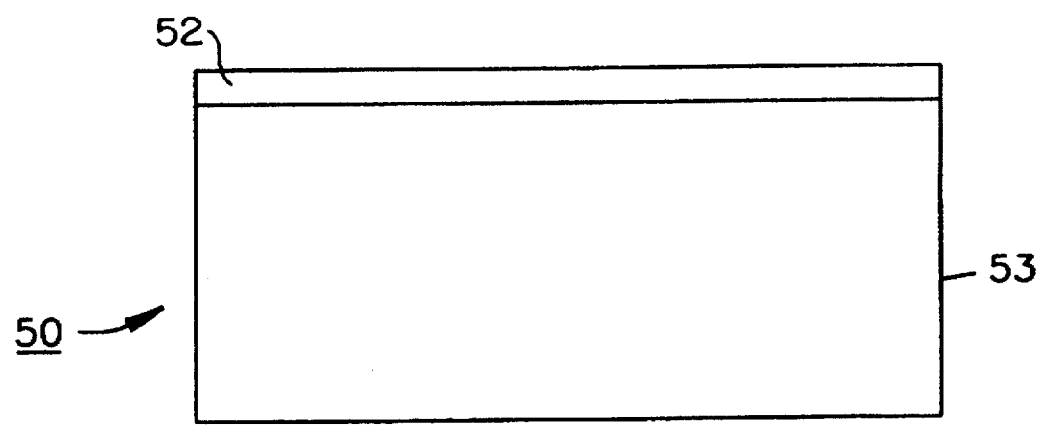
Figure 4C:
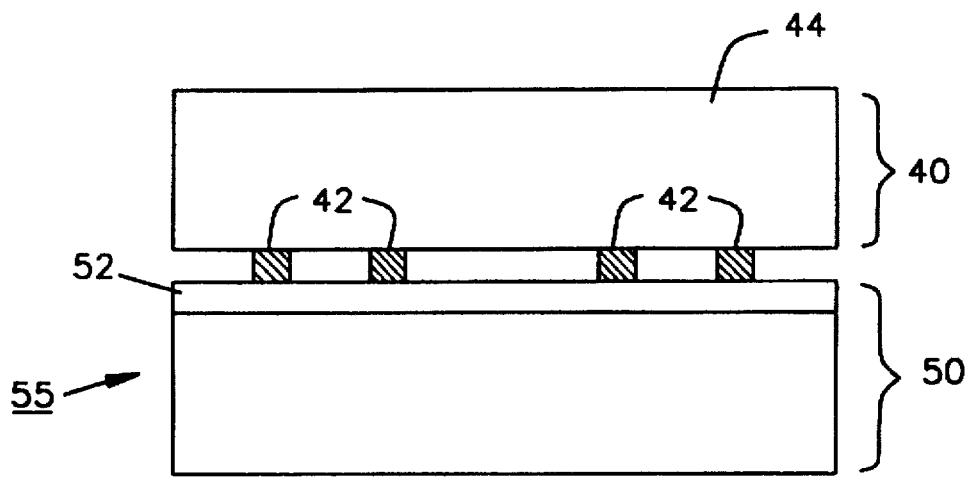

The construction of the high pressure transducer device and the placement, composition and crystallographic orientation of the gauges according to a preferred embodiment of the present invention is as follows:

Referring to FIGS. 4A–C, the first steps in the processing of a high pressure piezoresistive pressure transducer are depicted. The details of these processing steps are described in U.S. Pat. No. 5,286,671 entitled "FUSION BONDING TECHNIQUE FOR USE IN FABRICATING SEMICONDUCTOR DEVICES" issued to Anthony D. Kurtz et al. and assigned to Kulite Semiconductor Products, Inc., the assignee herein. The entire disclosure of U.S. Pat. No. 5,286,671 is incorporated herein by reference. Referring specifically to FIG. 4A, a pattern wafer 40, which may be made of single crystal semiconducting material 44 such as N-type silicon, is selected. Such wafers are commercially available and are well known in the art. The wafer 40 has high conductivity P+ (or P++) areas 42 which have been created thereon by diffusion using oxide and/or nitride masking and photolithography. After the diffusion process, the surface of the wafer 40 is treated with a conductivity-selective etch which does not attack the P+ (or P++) areas, leaving them raised from the surface as shown in FIG. 4A. The piezoresistive sensing elements 42 are fabricated from P+ (or P++) silicon in the (110) crystallographic plane. The sensors have a longitudinal <1$\bar{1}$0> direction and a transverse <100> direction in the surface plane. The transverse direction normal to the surface plane is <110>. In this arrangement, the sensors will have longitudinal and transverse piezoresistive coefficients in the plane of $\pi_{44}/2$ and 0, respectively. Correspondingly, the transverse piezoresistive coefficient normal to the surface plane is then $-\pi_{44}/2$.

Referring now to FIG. 4B, there is shown a carrier wafer 50, which will eventually form the diaphragm of the transducer. This semiconducting material 53 is lightly doped N- or P-type silicon in the (100) crystallographic plane. The carrier wafer 50 has a longitudinal <1$\bar{1}$0> direction and a transverse <110> direction in the plane of the diaphragm. The transverse direction normal to the surface plane is <100>. An oxide layer 52 is then grown on a surface of the wafer using any well known oxidation technique. A typical technique for providing an oxide layer on a silicon substrate is implemented by heating the wafer 50 to a temperature of between 1000°–1300° C. and passing oxygen over the surface of the substrate. The passivating oxide layer 52 in this case is silicon dioxide.

Referring now to FIG. 4C, the next step in the procedure is depicted. As shown therein, the pattern wafer 40 of FIG. 4A which contains the piezoresistive sensing elements 42 has been bonded to the carrier wafer 50 of FIG. 4B to form a composite wafer 55. The bonding process is performed in accordance with the preferred fusion bonding technique disclosed in the '671 patent. The technique described herein mimics that disclosed in the '671 patent and utilizes the earlier described P+ (or P++) doped semiconducting material 42 of the pattern wafer 40 and the oxide layer 52 of the carrier wafer 50 as bonding layers. Typical bonding conditions which join the two wafers together are temperatures of between 900°–1000° C. and times of between 5 and 10 minutes.

Figure 4D:
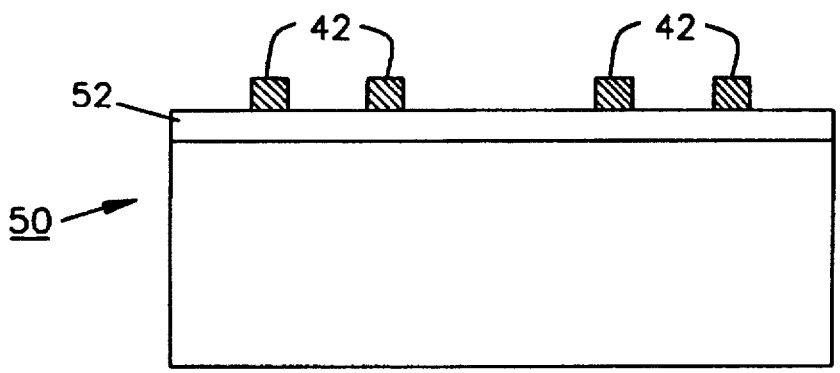

Referring now to FIG. 4D, it can be seen that the N-type silicon layer of the pattern wafer 40 has keen removed entirely down to the P+ (or P++) piezoresistive sensing elements 42 in a selective conductivity etching process which uses the oxide layer 52 of the carrier wafer 50 as an etch stop. Such selective conductivity etching processes are well known in the art and operate by means of etchants which selectively attack the low conductivity N-type material without etching or in any manner attacking the high conductivity P+ or P++ layers. One such process, in fact, is described in the '671 patent. After this etching process, the raised pattern of P+ (or P++) piezoresistive sensing elements 42 is left bonded to the dielectrically isolating layer 52 of the carrier wafer 50.

Figure 4E:
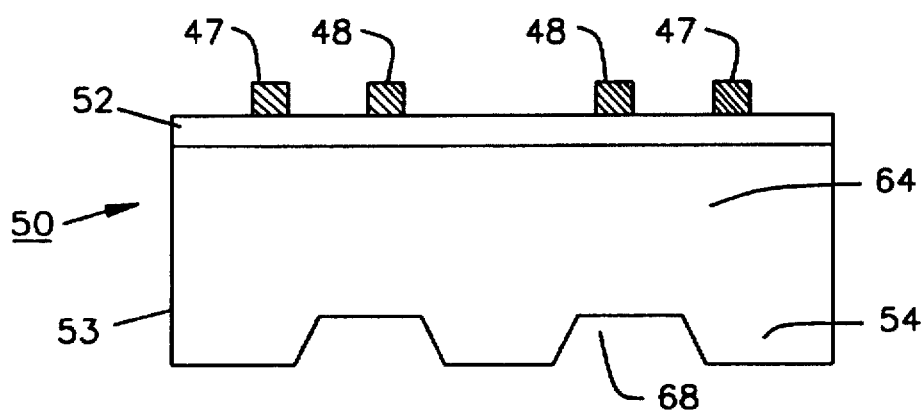

Referring now to FIG. 4E, the next step in the procedure is depicted. The single crystal (100) semiconducting material 53 of the carrier wafer 50 is etched on the side opposite the sensing elements by an isotropic or anisotropic etching technique. Here the choice of (100) silicon as a carrier wafer is obvious as a rectangular cavity is desired. Fabricating rectangular cavities in (100) silicon is relatively easy, which is not the case for other crystals. As an example, a diaphragm etched in (110) silicon will become a trapezoid instead of a rectangle. Both isotropic and anisotropic etching techniques are commonly practiced, and familiar to those skilled in the art. The etching process forms an aperture 68, which defines the active 64 and non-active 54 diaphragm areas. The thickness or vertical dimension of the active diaphragm area 64 may be of any desired dimension depending upon the length of time that the etching process is allowed to take place, but for a high pressure device is designed to be substantially the same size as the lateral dimension of the active diaphragm area. This produces an aspect ratio of the diaphragm that is of the order of magnitude of one. According to a preferred embodiment of the present invention, the aperture 68 is etched such that some of the sensing elements are positioned above the non-active or fixed diaphragm area 54, and others are positioned above the active or deflecting diaphragm area 64. Those sensing elements positioned above the non-deflecting diaphragm region are designated outer sensing elements 47, while those sensing elements positioned above the deflecting diaphragm region are designated inner sensing elements 48.

Figure 4F:
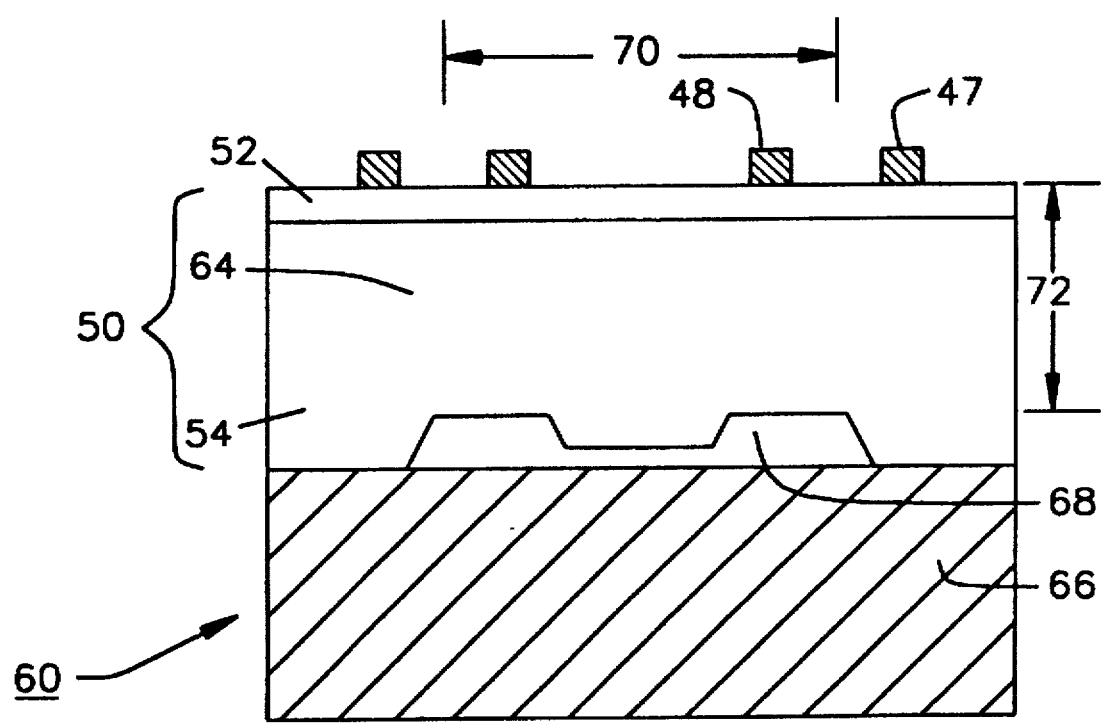
FIG. 4F depicts a cross-sectional view through the completed high pressure piezoresistive pressure transducer device constructed in accordance with the inventive method.

Referring now to FIG. 4F, there is shown the completed high pressure piezoresistive pressure transducer device 60. The carrier wafer 50, with the etched out aperture region 68 is finally secured to a supporting member 66. The supporting member 66 may be fabricated from single crystal silicon or may be glass. The bonding of the supporting member 66 to the carrier wafer 50 may be accomplished by means of an anodic bonding technique such as the one described in U.S. Pat. No. 4,040,172 entitled "METHOD OF MANUFACTURING INTEGRAL TRANSDUCER ASSEMBLIES APPLYING BUILT IN PRESSURE LIMITING" issued to Anthony D. Kurtz et al. and assigned to Kulite Semiconductor Products, Inc., the assignee herein. The entire disclosure of the '172 patent is incorporated herein by reference. The bond is typically formed by applying a high electrical voltage through the composite structure under low pressure and temperature, thus bonding the P+ single crystal (100) silicon carrier wafer 50 to the supporting member 66 and completing the device.

Figure 2A:
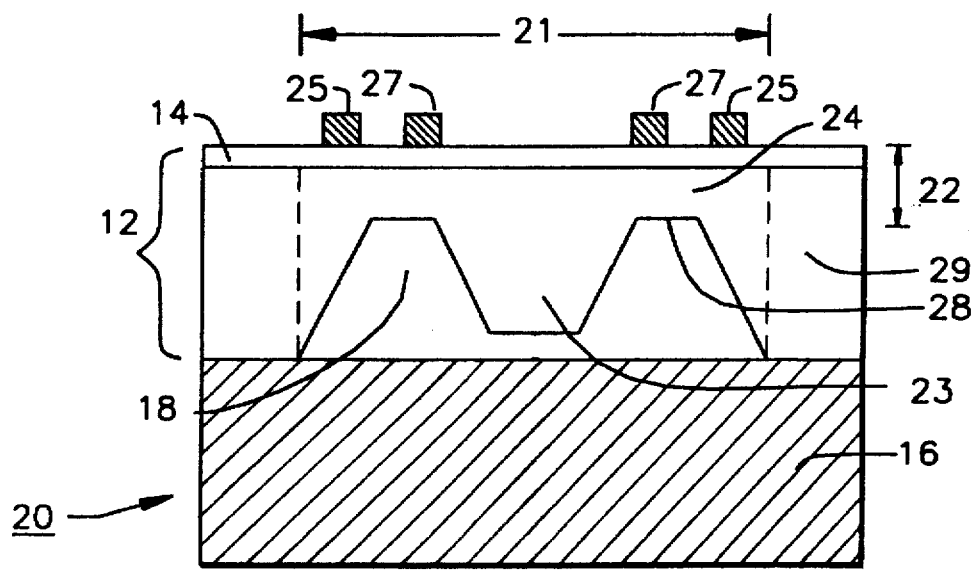
FIG. 2A depicts a cross-sectional view through an improved low pressure piezoresistive pressure transducer made in accordance with prior art techniques.
Figure 1B:
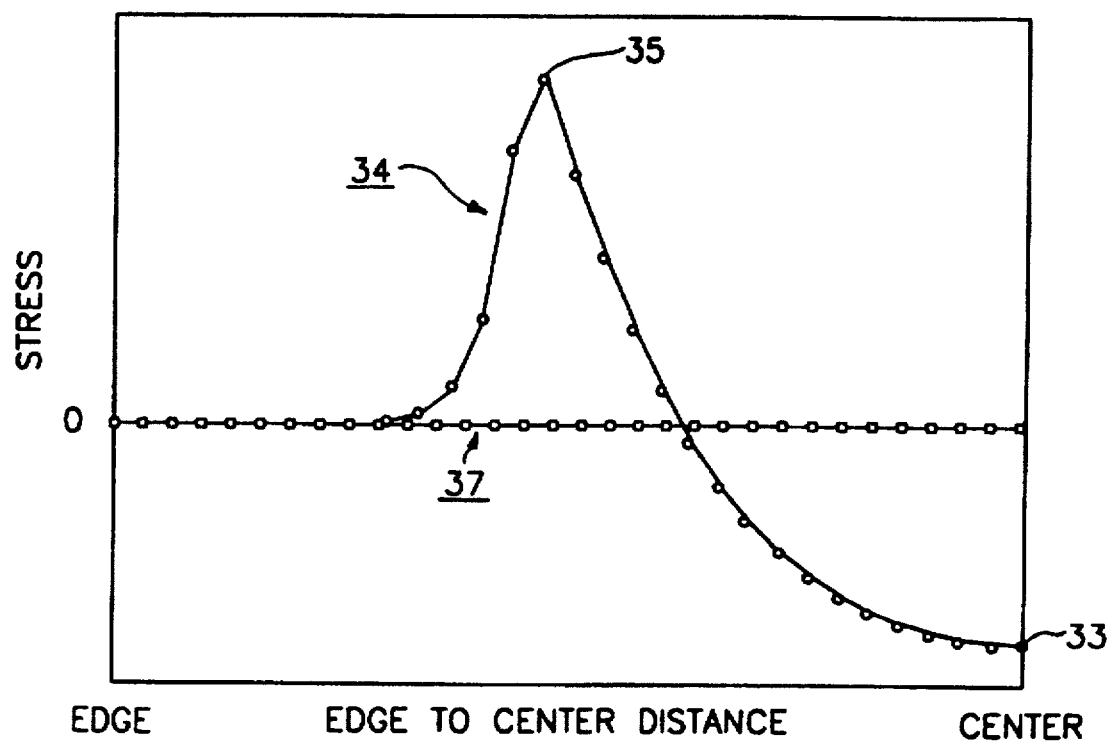
FIG. 1B depicts a graph showing the tensile and compressive stresses exhibited on the top surface of the transducer device of FIG. 1A over both the deflecting and non-deflecting portions.

As in the prior art device 10 depicted in FIG. 2A, the present device 60 depicted in FIG. 4F consists of a composite transducer structure having a highly doped semiconductive resistive pattern consisting of outer 47 and inner 48 domains, which essentially are of monocrystalline orientation, and which are dielectrically isolated from the carrier wafer 50 by means of a silicon dioxide layer 52. Both devices also contain supporting members (16 or 66) which are anodically or otherwise bonded to the carrier wafer. Notice should be taken of the significant difference in the vertical depth 72 of the active diaphragm region 64 (which is now of the same order of magnitude as its lateral dimension 70), the P+ (or P++) composition of the piezoresistive sensing elements 47 and 48, and the placement of these sensing elements in the high pressure device 60, in relation to their counterparts in the prior art low pressure invention 20. It is these changes which make possible the operation of the transducer device at pressures in excess of 20000 psi.

The placement of the inner 48 and outer 47 sensors in the device depicted in FIG. 4F can be rationalized by referring back to FIG. 3 and the discussion of longitudinal and transverse piezoresistive coefficients presented herein. Since one is no longer able to choose a point on the curve depicted in FIG. 3 that corresponds to a maximum in tensile stress, a distance that corresponds to the maximum point 84 on the upper curve 80 is chosen for the placement of the outer sensor 47. This distance corresponds to the placement of the sensor on the non-deflecting portion 54 of the carrier wafer 50 and, according to the discussion presented herein, gives rise to a positive changing sensor. Likewise, a point 86 which corresponds to a roughly equivalent in magnitude but opposite in sign minimum point in the upper curve 80 is chosen for the placement of the inner sensor 48. This distance corresponds to the placement of the inner sensor 48 above a deflecting portion 64 of the carrier wafer 50 giving rise to a negative changing sensor.

Following this procedure, one ends up with a high pressure piezoresistive transducer device having a positive changing sensor with a large transverse piezoresistive coefficient normal to the plane of the diaphragm, a large longitudinal coefficient in the plane of the diaphragm, and a very small transverse piezoresistive coefficient in the plane of the diaphragm. This positive changing sensor is placed on the non-deflecting portion of the diaphragm in a position of minimal longitudinal stress. The device also has a negative changing sensor with a large transverse piezoresistive coefficient normal to the plane of the diaphragm, a large longitudinal coefficient in the plane of the diaphragm, and a very small transverse piezoresistive coefficient in the plane of the diaphragm. This negative changing sensor is placed on the deflecting portion of the diaphragm in a position of high compressive stress, and is further placed such that there will be equal and opposite resistance changes registered from the sensors.

Figure 5:
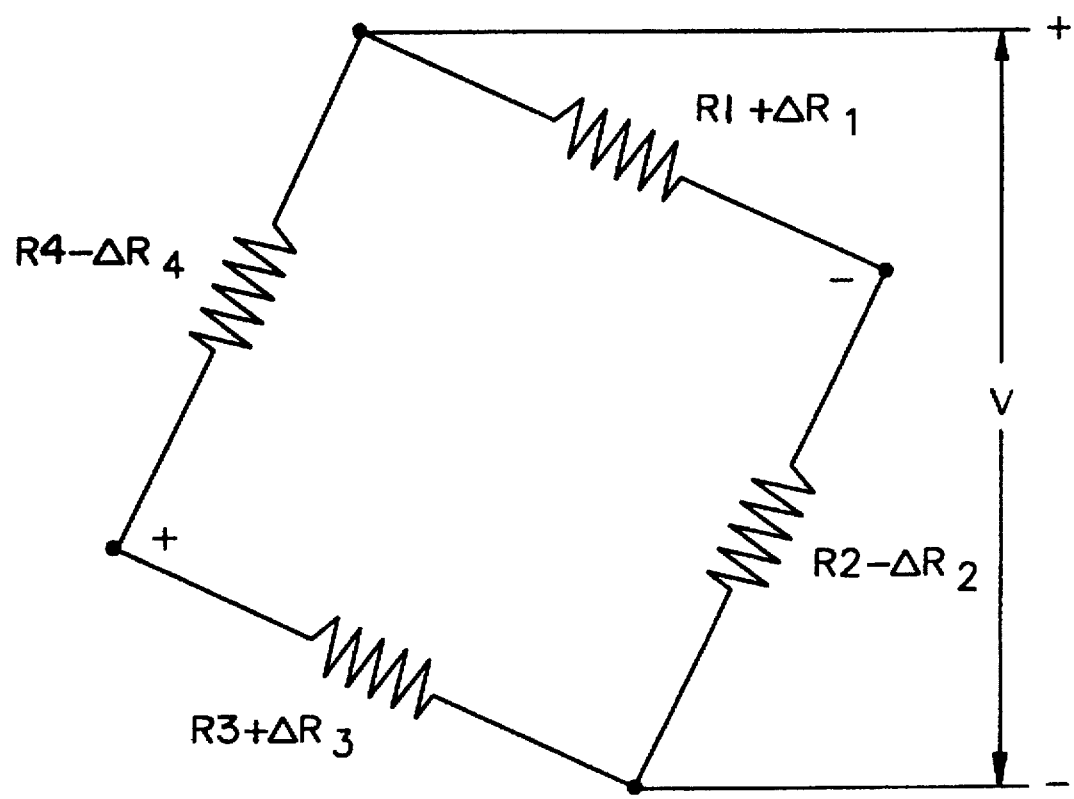
FIG. 5 is a schematic diagram depicting the Wheatstone bridge array employed in the present invention.

To complete the transducer device, the piezoresistive sensing elements 47 and 48 are subsequently arranged in a Wheatstone bridge assembly, the circuit diagram of which is depicted in FIG. 5. In the diagram, resistors R1 and R3 are positive changing, and hence correspond to the outer piezoresistive sensing elements 47 discussed herein. Resistors R2 and R4 are negative changing, and hence correspond to the inner piezoresistive sensing elements 48 discussed herein. The bridge is formed by electrically connecting resistor R1 to resistor R2 in series to form half of the bridge and resistor R3 and resistor R4 in series to form the other half of the bridge. The output voltage generated by this Wheatstone bridge circuit can be calculated using equation (8). Through the proper placement of the sensors in the transducer device, the changes in resistance can be made equal in magnitude and opposite in sign thus reducing the electrical non-linearity of the device.

As should now be apparent, the present invention substantially overcomes many of the problems associated with conventional piezoresistive pressure transducers when operated at high pressures. In particular, the present invention reduces the inherent mechanical non-linearity associated with the diaphragm member by increasing its thickness so that its vertical dimension is of the same order of magnitude as its lateral dimension, while also reducing electrical non-linearity associated with the Wheatstone bridge circuitry by placing gauges on both the deflecting diaphragm region and on a non-deflecting portion of the diaphragm, which, by their placement, exhibit equal in magnitude but opposite in sign resistance changes as a function of applied pressure. The combination of these attributes results in an improved transducer device when compared to prior art.

It should be understood that the embodiments described herein are merely exemplary and that a person skilled in the art may make reasonable variations and modifications to these embodiments utilizing functionally equivalent elements to those described herein. Any and all such variations or modifications, as well as others which may become apparent to those skilled in the art, are intended to be included with the scope and spirit of the invention as defined by the appended claims.

What is claimed is:

1. A method for fabricating a high pressure piezoresistive transducer comprising the steps of:

bonding a pattern wafer containing at least two sensing elements of a semiconductor material to a carrier wafer of a semiconducting material and having a dielectric isolating layer on one surface;

etching said pattern wafer to leave said piezoresistive sensing elements disposed on said dielectric layer;

forming a diaphragm member in said carrier wafer said diaphragm member having a deflecting portion and a non-deflecting portion, said deflecting portion being positioned under at least one of said at least two piezoresistive sensing elements and said non-deflecting portion being positioned under said other one of said at least two piezoresistive sensing elements;

bonding an insulating supporting member to said carrier wafer on the surface opposite to said piezoresistive sensing elements; and forming an electrically coupled bridge arrangement such that said piezoresistive sensing element positioned over said non-deflecting portion of said diaphragm member exhibits a positive change in resistance and is connected in series with said other one of said at least two piezoresistive sensing elements which is positioned above said deflecting portion of said diaphragm member and exhibits a negative change in resistance.

2. The method according to claim 1, wherein the aspect ratio of said diaphragm member is made to be of the order magnitude of one.

3. The method according to claim 1, wherein said bonding of said carrier wafer to said pattern wafer comprises fusion bonding.

4. The method according to claim 1, further comprising the step of etching said carrier wafer such that the vertical depth of said diaphragm member is substantially the same order of magnitude as the lateral dimension of said diaphragm member.

5. The method according to claim 1, wherein said dielectric isolating layer is formed by a process which includes the steps of:

heating said carrier wafer to a temperature of between 1000°–1300° C. and passing a stream of oxygen over the surface of said carrier wafer.

6. The method according to claim 1, wherein said step of bonding said insulating supporting member to said carrier wafer comprises an anodic bonding process.

* * * * *